(12) United States Patent
Wagner et al.

(10) Patent No.: US 10,357,845 B2
(45) Date of Patent: Jul. 23, 2019

(54) DEVICE FOR WELDING ROD-SHAPED CONDUCTORS COMPRISING A KNIFE DEVICE

(71) Applicant: Schunk Sonosystems GmbH, Wettenberg (DE)

(72) Inventors: Peter Wagner, Wettenberg (DE); Dieter Stroh, Wettenberg (DE); Rainer Wagenbach, Merenberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 222 days.

(21) Appl. No.: 15/512,425

(22) PCT Filed: Sep. 9, 2015

(86) PCT No.: PCT/EP2015/070572
§ 371 (c)(1),
(2) Date: Mar. 17, 2017

(87) PCT Pub. No.: WO2016/041825
PCT Pub. Date: Mar. 24, 2016

(65) Prior Publication Data
US 2017/0282289 A1 Oct. 5, 2017

(30) Foreign Application Priority Data
Sep. 17, 2014 (DE) .................. 10 2014 013 452

(51) Int. Cl.
*B23K 20/10* (2006.01)
*B23D 15/08* (2006.01)
(Continued)

(52) U.S. Cl.
CPC .............. *B23K 20/10* (2013.01); *B23D 15/08* (2013.01); *B23K 20/26* (2013.01); *B23K 28/02* (2013.01);
(Continued)

(58) Field of Classification Search
CPC ...... B23K 20/10; B23K 20/106; B23K 28/02; H01R 43/0207; H01R 43/0263; B23D 15/08
(Continued)

(56) References Cited

U.S. PATENT DOCUMENTS

| 4,869,419 A | 9/1989 | Nuss | |
| 8,434,669 B1* | 5/2013 | Cheng .................. | B23K 20/004 228/180.5 |

(Continued)

FOREIGN PATENT DOCUMENTS

| CN | 2721345 Y | 8/2005 |
| CN | 102870292 A | 1/2013 |

(Continued)

OTHER PUBLICATIONS

PCT English Language Translation of the International Preliminary Report on Patentability, PCT/EP2015/070572, dated Mar. 30, 2017.
(Continued)

*Primary Examiner* — Erin B Saad
*Assistant Examiner* — Carlos J Gamino
(74) *Attorney, Agent, or Firm* — Quarles & Brady LLP (57) ABSTRACT

The invention relates to a device for welding rod-shaped conductors (14), comprising a compression chamber for receiving joining sections (13) of the conductors to be joined together, the compression chamber being limited in a first axial direction (z-axis) on two opposite sides by an active surface of a sonotrode (16) transmitting ultrasonic vibrations in the direction of the z-axis and by a counter surface of a counter electrode (18), the device having a knife device which is provided with a drive device and comprises a knife (24) movable in the direction of the z-axis, said knife having a cutting edge which can be moved past the compression chamber, wherein a drive motor of the drive device is (Continued)

arranged in an installation space arranged below the sonotrode, the drive motor being connected to a knife holder (26) via a deflection gear (31) in order for the knife to be able to perform a cutting motion, the knife being moveable in the direction of the z-axis.

10 Claims, 6 Drawing Sheets

(51) Int. Cl.
*B23K 20/26* (2006.01)
*B23K 28/02* (2014.01)
*H01R 43/02* (2006.01)
*H01R 4/02* (2006.01)
*B23K 101/38* (2006.01)

(52) U.S. Cl.
CPC .............. *H01R 4/021* (2013.01); *H01R 4/029* (2013.01); *H01R 43/0207* (2013.01); *H01R 43/0263* (2013.01); *B23K 2101/38* (2018.08)

(58) Field of Classification Search
USPC ........................................ 83/350, 356.2, 561
See application file for complete search history.

(56) References Cited

U.S. PATENT DOCUMENTS

| | | | |
|---|---|---|---|
| 2006/0278682 A1* | 12/2006 | Lange | B23K 20/004 228/4.5 |
| 2011/0232083 A1* | 9/2011 | Daitou | H01R 4/20 29/825 |

FOREIGN PATENT DOCUMENTS

| | | |
|---|---|---|
| DE | 3719083 C1 | 9/1988 |
| DE | 4406337 A1 | 8/1995 |
| EP | 0286975 A2 | 10/1988 |
| WO | 2011076515 A1 | 6/2011 |

OTHER PUBLICATIONS

PCT International Search Report, PCT/EP2015/070572, dated Feb. 4, 2016.

Schunk Sonosystems, Schunk Ultrasonic Welding Systems MINIC—II (Brochure), 2011, 3 pages.

\* cited by examiner

DEVICE FOR WELDING ROD-SHAPED CONDUCTORS COMPRISING A KNIFE DEVICE

CROSS-REFERENCE TO RELATED APPLICATIONS

This application represents the national stage entry of PCT International Application No. PCT/EP2015/070572 filed Sep. 9, 2015 and claims priority to German Patent Application No. 10 2014 013 452.0 filed Sep. 17, 2014. The contents of these applications are hereby incorporated by reference as if set forth in their entirety herein.

The present invention relates to a device for welding rod-shaped conductors, comprising a compression chamber for receiving joining sections of the conductors to be joined together, the compression chamber being limited in a first axial direction (z-axis) on two opposite sides by an active surface of a sonotrode transmitting ultrasonic vibrations in the direction of the z-axis and by a counter surface of a counter electrode and in a second axial direction (y-axis) on two opposite sides by a limiting surface of a slider element which can be moved in the direction of the y-axis and by a limiting surface of a limiting element, the device having a knife device which is provided with a drive device and comprises a knife movable in the direction of the z-axis, said knife having a cutting edge which can be moved past the compression chamber and cooperates with a counter cutting edge which limits the compression chamber or is arranged adjacent to the compression chamber, the cooperation being such that joining sections arranged within the compression chamber are severed from the conductors when the knife device is activated.

In a known device of the kind mentioned above, a drive motor is provided for driving the knife device, said drive motor being arranged in an installation space formed adjacent to the compression chamber in the direction of an x-axis. The drive motor is realized as a pneumatic cylinder and causes a cutting motion of the knife with its piston rod, which extends in the direction of the z-axis and is connected to the knife holder.

The knife device formed on the known device is often called a bad-part cutter, which is supposed to prevent faulty weld-node connections produced with the device from being processed. To this end, the device is configured in such a manner that the process parameters and/or the geometry of the weld node produced in the compression chamber is/are checked in situ during production of the weld-node connection in the compression chamber and the knife device is automatically activated if mistakes are detected, such as an exceedance of defined limit values, so as to make subsequent use of the conductors impossible by severing the badly welded joining section.

The known device, which is provided with a knife device, has larger dimensions in the direction of the x-axis compared to a device without a knife device because the knife device including the drive device is arranged adjacent to the compression chamber, the dimensions in the direction of the x-axis thus being enlarged by the installation space. Moreover, the selected arrangement of the installation space adjacent to the compression chamber in the x-axis limits accessibility of the compression chamber. In particular in case of manual introduction of the joining sections of the conductors into the compression chamber, the distance for handling between an outer contour of the device and the compression chamber is enlarged by the installation space, which may make handling the conductors for exact positioning in the compression chamber more difficult.

Hence, the object of the present invention is to provide a device of the kind mentioned above which does not cause any enlargement of the outer dimensions relevant to the practical use of the device in spite of the addition of a knife device. Moreover, the invention has the object of providing a device of the kind mentioned above in which the knife device does not constrain handling of the conductors to be joined by means of the device.

To solve this object, the device according to the invention has the features of claim 1.

In the device according to the invention, a drive motor of the drive device is arranged in an installation space arranged below the sonotrode, the drive motor being connected to a knife holder via a deflection gear in order for the knife to be able to perform a cutting motion, the knife holder being movable in the direction of the z-axis.

The design of the device according to the invention thus allows arranging the drive motor in an installation space which does not add to an enlargement of the dimensions of the device in the direction of the x-axis, only the functional parts of the knife device that are needed for the actual cutting process, namely the knife and the knife holder, having to be arranged upstream of the compression chamber in the direction of the x-axis in order to be able to perform the cutting motion, without these parts protruding beyond the outer contour of the device. The arrangement of the drive motor in the installation space arranged below the sonotrode has no influence on the dimensions of the device in the direction of the x-axis.

It is particularly advantageous if the knife holder is provided with a guiding device for guiding the knife holder in a translatory manner in the direction of the z-axis, the guiding device being arranged in an installation plane formed in an outer contour of the device or adjacent to the outer contour so that the installation of the knife holder in a plane extending in the direction of the z-axis remains without substantial influence on the dimensions of the device in the direction of the x-axis.

If the guiding device is designed as a guiding insert inserted into a recess of a device housing, the guiding device can even be installed without any additional installation space because the space needed for the housing anyway is used in this case.

Preferably, the deflection gear of the drive device is realized as a traction-means drive, allowing substantially arbitrary relative arrangements between the drive motor and the knife holder.

In a particularly preferred embodiment, the deflection gear has a traction-means train whose drive end is connected to a piston rod of a power cylinder and whose output end is connected to the knife holder, the traction-means train being deflected via a deflection wheel in such a manner that the drive end extends in the direction of the piston rod of the power cylinder and an output end extends in the direction of the z-axis, allowing advantageous power transmission.

Preferably, the power cylinder is composed of multiple cylinder modules arranged in series in the direction of the piston rod so that a high cylinder power is achieved with a power cylinder structure as lean as possible, which allows the power cylinder to be installed in a space-saving manner with little installation height.

If the tension-means train is realized as a chain which is deflected via a gear wheel so as to form the deflection gear, particularly high acceleration of the motion of the knife holder is possible without the risk of slippage between the deflection wheel and the tension-means train.

If a spring device is provided in order for a restoring motion of the knife to be performed after performing a cutting motion, a particularly quick restoring motion becomes possible and, additionally, a zero-play operation of the traction-means drive is ensured at the same time.

It is particularly advantageous if the spring device is arranged between the knife holder and the guiding device of the knife holder because this ensures that the spring motion occurs in a purely translatory manner in the direction of the z-axis.

If sensors are provided which are arranged at end points of the cutting motion performed by the knife, correct performance of the cutting process can be monitored.

If the sensors are additionally connected to a recording device to record output signals of the sensors, correct performance of the cutting process can be documented.

In the following description, a preferred embodiment of the invention will be explained in more detail with reference to the drawing.

In the drawing.

Figure 1:
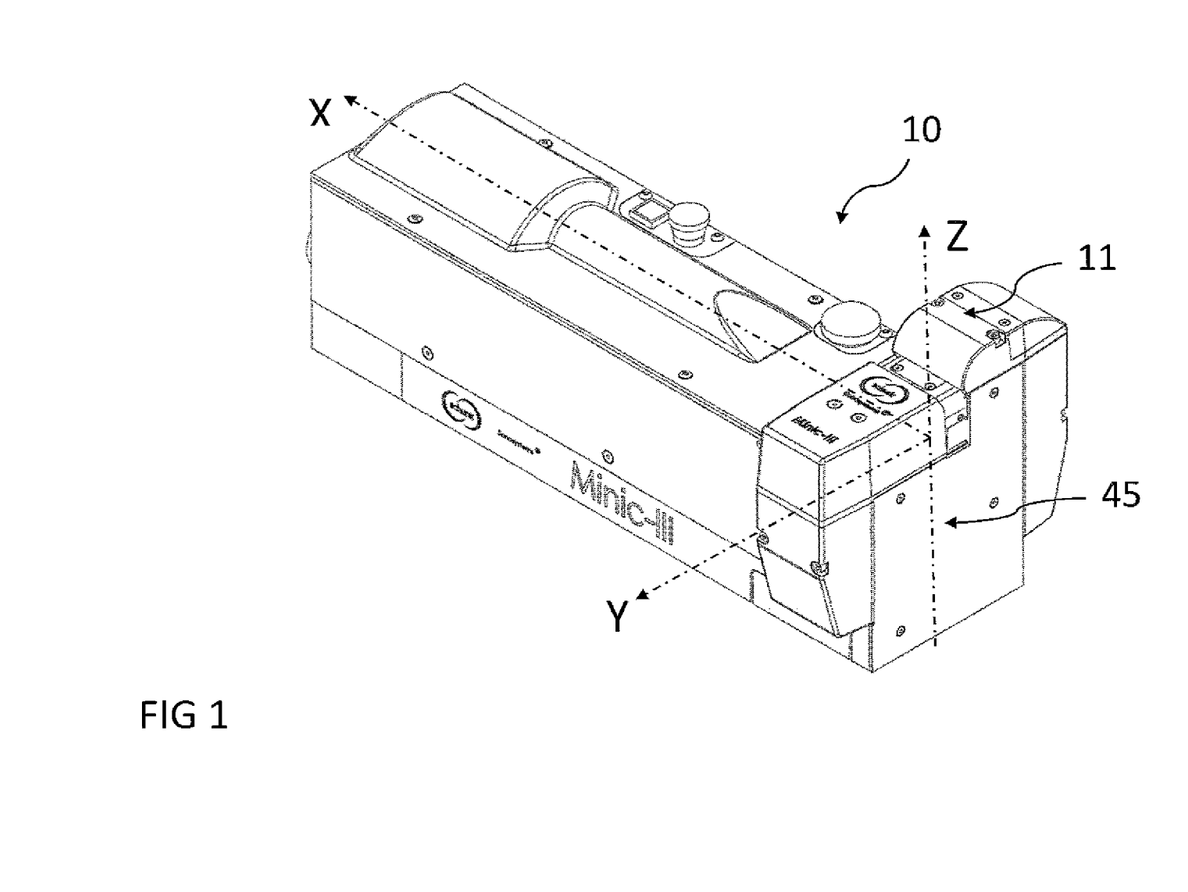
FIG. 1 shows an isometric illustration of the device.
Figure 3:
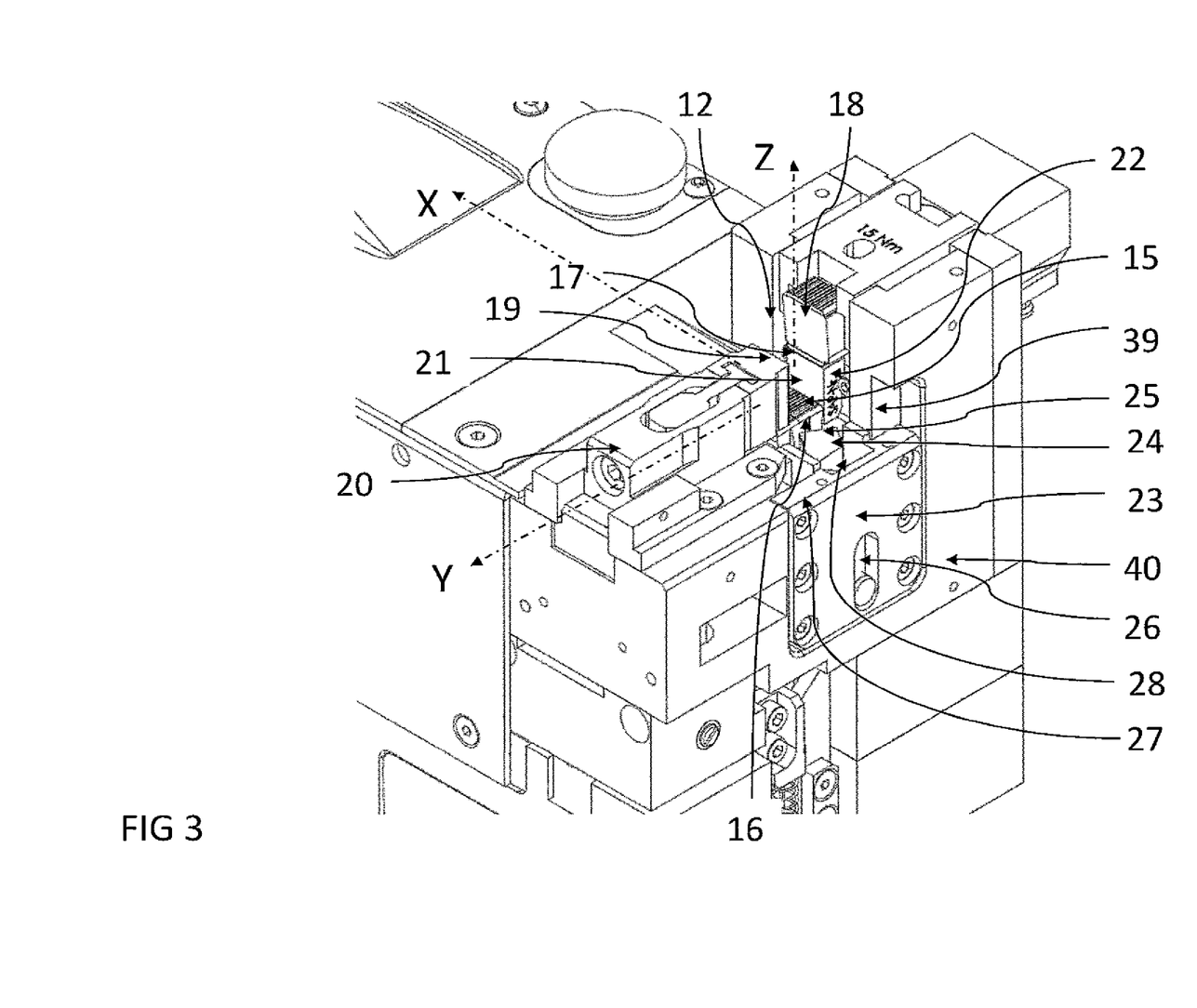
FIG. 3 shows a partial illustration of the device illustrated in FIG. 1, including an isometric illustration of the compression chamber.

FIG. 1 shows an isometric illustration of a device 10 having a compression chamber 12, illustrated in particular in FIG. 3, under a cover 11.

Figure 5:
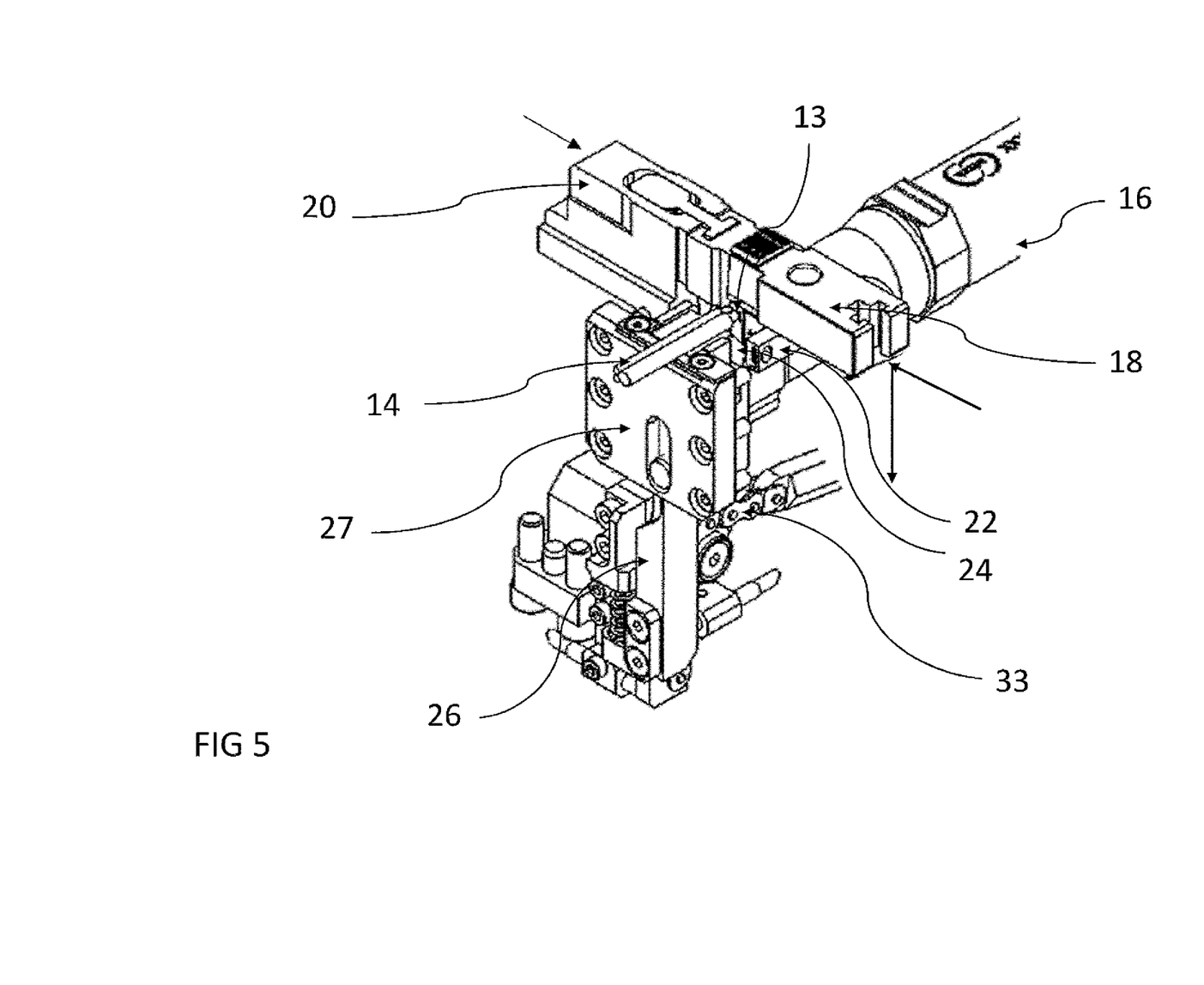
FIG. 5 shows the knife device immediately prior to a cutting process.

The compression chamber 12 serves to receive joining sections 13 of electrical conductors 14, which are illustrated in FIG. 5, for example, the compression chamber 12 being limited in the direction of a z-axis on two opposite sides, as illustrated in particular in FIG. 3, by an active surface 15 of a sonotrode 16 transmitting ultrasonic vibrations in the direction of the x-axis and by a counter surface 17 of a counter electrode 18, which is moveable in the direction of a y-axis and is often called anvil, and in the direction of the y-axis on two opposite sides by a limiting surface 19 of a slider element 20 moveable in the direction of the y-axis and by a limiting surface 21 of a limiting element 22, which is often called touching element.

In the direction of an x-axis, which is identical with the longitudinal axis of the sonotrode 16 in the case at hand, a knife device 23 is provided adjacent to the compression chamber 12, the knife device 23 comprising a knife 24 which is moveable in the direction of the z-axis and is connected to a knife holder 26 via a screw connection in the case of the embodiment example at hand. FIG. 3 shows the knife 24 in the lower knife position, in which a cutting edge 25 of the knife 24 is located immediately below the active surface 15 of the sonotrode 16.

As can be seen in particular in FIG. 3, the knife holder 26 is guided in a guiding device 27, which has a guiding groove 28 extending in the direction of the z-axis for this purpose.

Figure 2:
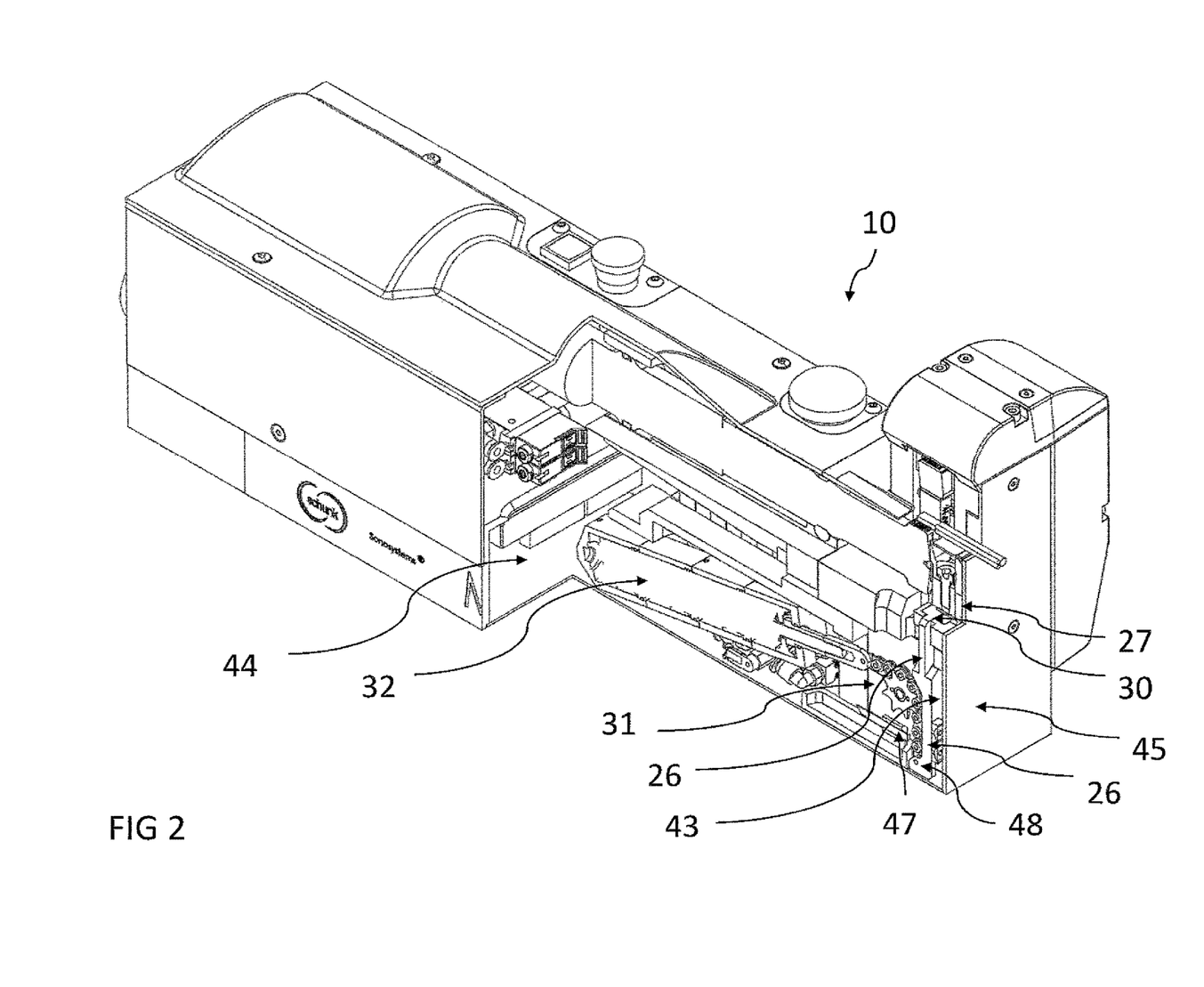
FIG. 2 shows a longitudinal sectional illustration of the device illustrated in FIG. 1.
Figure 4:
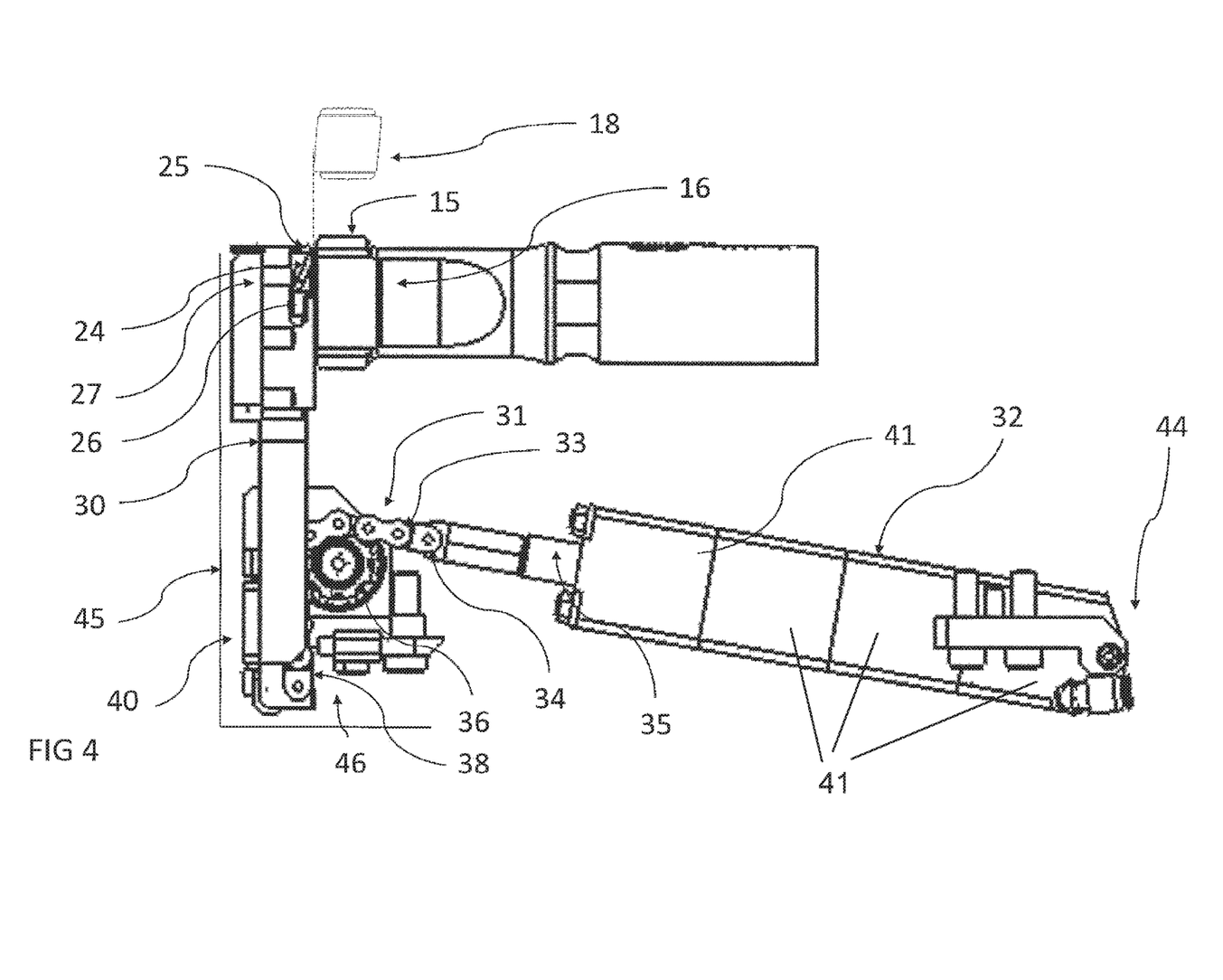
FIG. 4 shows a schematic illustration of the device.

As shown in FIGS. 2 and 4, the knife holder 26, which is provided with an offset 30 in the case of the embodiment example at hand, is connected to a drive motor, which is realized as a pneumatic power cylinder 32 in the case of the embodiment example at hand, via a deflection gear 31.

As can be seen in particular in the schematic illustration of FIG. 4, the deflection gear 31 has a tension-means train, which is realized as a chain 33 and whose drive end 34 is connected to a piston rod 35 of the power cylinder 32. The chain 33 is deflected via a deflection wheel, which is realized as a gear wheel 36 in this case, so that the drive end 34 of the chain 33 extends in the direction of the piston rod 35 and an output end 38, which is connected to the knife holder 26, extends in the direction of the z-axis.

As can be seen in particular in FIG. 3, the guiding device 27 is realized as an insert inserted into a corresponding recess 39 of a housing part 40 of the device 10.

During operation of the device, the compression chamber 12 is closed once the joining sections 13 of the conductors 14 to be joined together have been placed in the compression chamber 12, the counter electrode 18 being moved in the direction of the y-axis and the slider element 20 being moved in the opposite direction of the y-axis, the compression chamber 12 thus being closed, as illustrated in FIG. 5, and the joining sections 13 of the conductors 14 being in defined contact with each other. Then, the joining sections 13 of the conductors 14 are subjected to mechanical vibrations of the sonotrode 16 in such a manner that the joining sections 13 are compressed and joined together in a friction-welding process so as to form a weld node.

Figure 6:
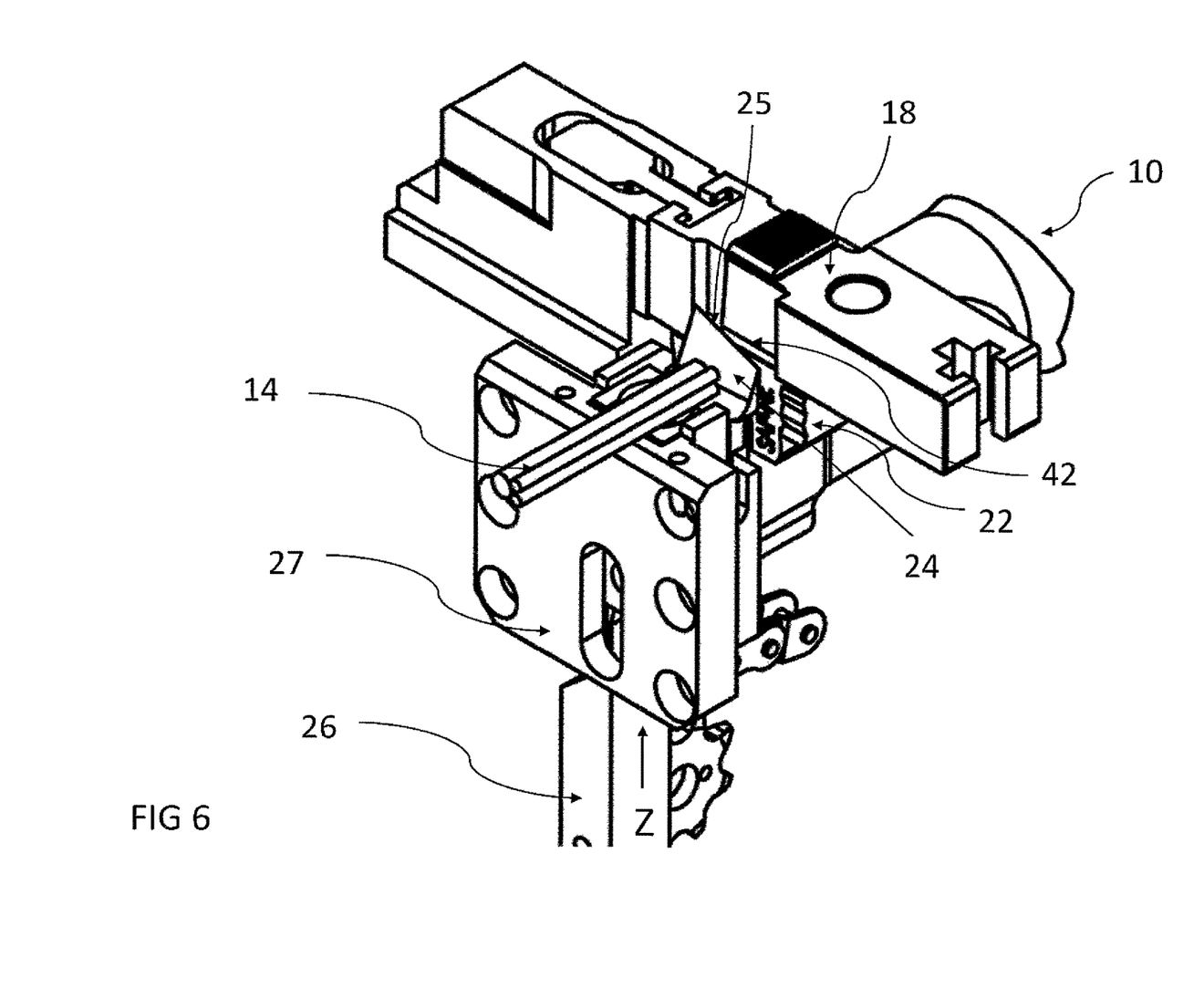
FIG. 6 shows the knife device immediately after a cutting process.

If a faulty welding parameter or a faulty geometry of the produced weld node is detected, the knife device 23 is activated while the compression chamber is still closed by pressurizing the power cylinder 32, which, as illustrated in FIG. 4, is composed of four power cylinder elements 41 arranged in series in the case of the embodiment example at hand, so that the knife 24 is moved upward in the direction of the z-axis via the deflection gear 31 and, as illustrated in FIG. 6, the joining sections 13 are severed from the conductors 14 in cooperation with a counter cutting edge 42 formed on the counter electrode 18.

As can be seen in particular in FIG. 2, a spring device 43 is provided in order for the knife 24 to perform a restoring motion after performing the cutting motion, the spring device 43 being arranged between the knife holder 26 and the guiding device 27 and realized as a pressure spring in the case of the embodiment example at hand. Sensors 47 are provided to detect an upper end point and a lower end point of the cutting motion of the knife 24, only the lower sensor 47 being illustrated in FIG. 2, which is realized as an inductive sensor in the case at hand and cooperates with a cam 48 of the knife holder 26.

As can be seen in particular in FIGS. 2 and 4, the power cylinder 32 is located in an installation space 44 arranged below the sonotrode 16, so only the components of the knife device 23 that are needed for performing the cutting motion are arranged upstream of the compression chamber 12 in the direction of the x-axis and in particular the guiding device 27 is arranged in an installation plane 46 which extends in the direction of the z-axis and, as becomes clear in particular from a combined view of FIGS. 2 and 4, is realized in an outer contour 45 of the device 10 defined by the housing part 40. There is substantially no elongation of the device 10 in the direction of the x-axis because of the arrangement of the knife device 23 on the device 10.

The invention claimed is:

1. A device for welding rod-shaped conductors, said device comprising:
   a compression chamber for receiving joining sections of conductors to be joined together, the compression chamber being limited in a first axial direction (z-axis) on two opposite sides by an active surface of a sonotrode transmitting ultrasonic vibrations in the direction of the z-axis and by a counter surface of a counter electrode and in a second axial direction on two opposite sides by a limiting surface of a slider element which can be moved in the direction of the y-axis and by a limiting surface of a limiting element;

a knife device including a knife movable in the direction of the z-axis, said knife having a cutting edge which can be moved past the compression chamber and cooperates with a counter cutting edge which limits the compression chamber, the cooperation being such that joining sections arranged within the compression chamber are severed from the conductors by the knife cooperating with the counter cutting edge; and a drive motor arranged in an installation space arranged below the sonotrode, the drive motor being connected to a knife holder via a deflection gear in order for the knife to be able to perform a cutting motion, the knife holder being movable in the direction of the z-axis.

2. The device according to claim 1, in which the knife holder includes a guiding device guiding the knife holder in a translatory manner in the direction of the z-axis, the guiding device being arranged in an installation plane formed in an outer contour of the device.

3. The device according to claim 2, in which the guiding device (27) is a guiding insert inserted into a recess of a device housing.

4. The device according to claim 2, in which the deflection gear is a traction-means drive.

5. The device according to claim 4, in which the deflection gear has a traction-means train whose drive end is connected to a piston rod of a power cylinder and whose output end is connected to the knife holder, the traction-means train being deflected via a deflection wheel in such a manner that the drive end extends in the direction of the piston rod of the power cylinder and the output end extends in the direction of the z-axis.

6. The device according to claim 5, in which the power cylinder is modularly composed of multiple power cylinder elements arranged in series in the direction of the piston rod.

7. The device according to claim 5, in which the traction-means train is a chain which is deflected via a gear wheel to forming the deflection gear.

8. The device according to claim 5, in which a spring device resets motion of the knife holder so as to perform a resetting motion of the knife after performing a cutting motion.

9. The device according to claim 8, in which the spring device is arranged between the knife holder and the guiding device of the knife holder.

10. The device according to claim 1, including sensors arranged at end points of the cutting motion performed by the knife.

* * * * *